(12) United States Patent
Nagao et al.

(10) Patent No.: US 9,688,354 B2
(45) Date of Patent: Jun. 27, 2017

(54) SNOWMOBILE

(71) Applicant: Yamaha Hatsudoki Kabushiki Kaisha, Iwata-shi, Shizuoka (JP)

(72) Inventors: Tokinari Nagao, Shizuoka (JP); Atsushi Sawabuchi, Shizuoka (JP); Takashi Ashida, Shizuoka (JP); Manabu Kai, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 393 days.

(21) Appl. No.: 14/315,354

(22) Filed: Jun. 26, 2014

(65) Prior Publication Data

US 2014/0305726 A1    Oct. 16, 2014

Related U.S. Application Data

(63) Continuation of application No. 12/911,556, filed on Oct. 25, 2010, now Pat. No. 8,763,745.

(30) Foreign Application Priority Data

Oct. 26, 2009  (JP) ................. 2009-245097

(51) Int. Cl.
*B62M 27/02* (2006.01)
*F02D 11/10* (2006.01)
*F02M 35/10* (2006.01)
*F02M 35/16* (2006.01)

(52) U.S. Cl.
CPC ............. *B62M 27/02* (2013.01); *F02D 11/10* (2013.01); *F02M 35/10255* (2013.01); *F02M 35/162* (2013.01)

(58) Field of Classification Search
CPC ..... B62M 27/02; B62M 27/023; F02D 11/10; F02D 11/102; F02D 11/103; F02D 11/104; F02M 35/10255; F02M 35/162; F02M 35/1055
USPC ......................................... 180/291
See application file for complete search history.

(56) References Cited

U.S. PATENT DOCUMENTS

| | | | | |
|---|---|---|---|---|
| 3,583,506 A | * | 6/1971 | Preble ..................... | B62J 27/00 180/335 |
| 6,725,958 B2 | * | 4/2004 | Ashida .................... | F02B 67/06 123/195 R |
| 6,948,990 B2 | * | 9/2005 | Hattori .................. | F02B 61/045 123/361 |
| 7,311,082 B2 | * | 12/2007 | Yokoi ..................... | F02D 9/105 123/399 |

(Continued)

OTHER PUBLICATIONS

Nagao et al.; "Snowmobile"; U.S. Appl. No. 12/911,556, filed Oct. 25, 2010.

*Primary Examiner* — John Walters
(74) *Attorney, Agent, or Firm* — Keating and Bennett, LLP

(57) ABSTRACT

A snowmobile has a structure that reduces and minimizes adverse affects of snow on a throttle motor. The snowmobile includes a snowmobile body including an engine room therein, an engine which is disposed inside the engine room, a throttle valve arranged to adjust intake air supplied to the engine, a throttle motor arranged to drive the throttle valve and disposed ahead of the engine, and an air box arranged to pass the intake air through toward the engine, disposed ahead of the engine and including a portion located ahead of the throttle motor.

36 Claims, 7 Drawing Sheets

(56) References Cited

U.S. PATENT DOCUMENTS 7,318,410 B2 * 1/2008 Yokoi .................. F02D 9/1095
123/399
7,353,901 B2 * 4/2008 Abe ...................... B62M 27/02
180/182

* cited by examiner

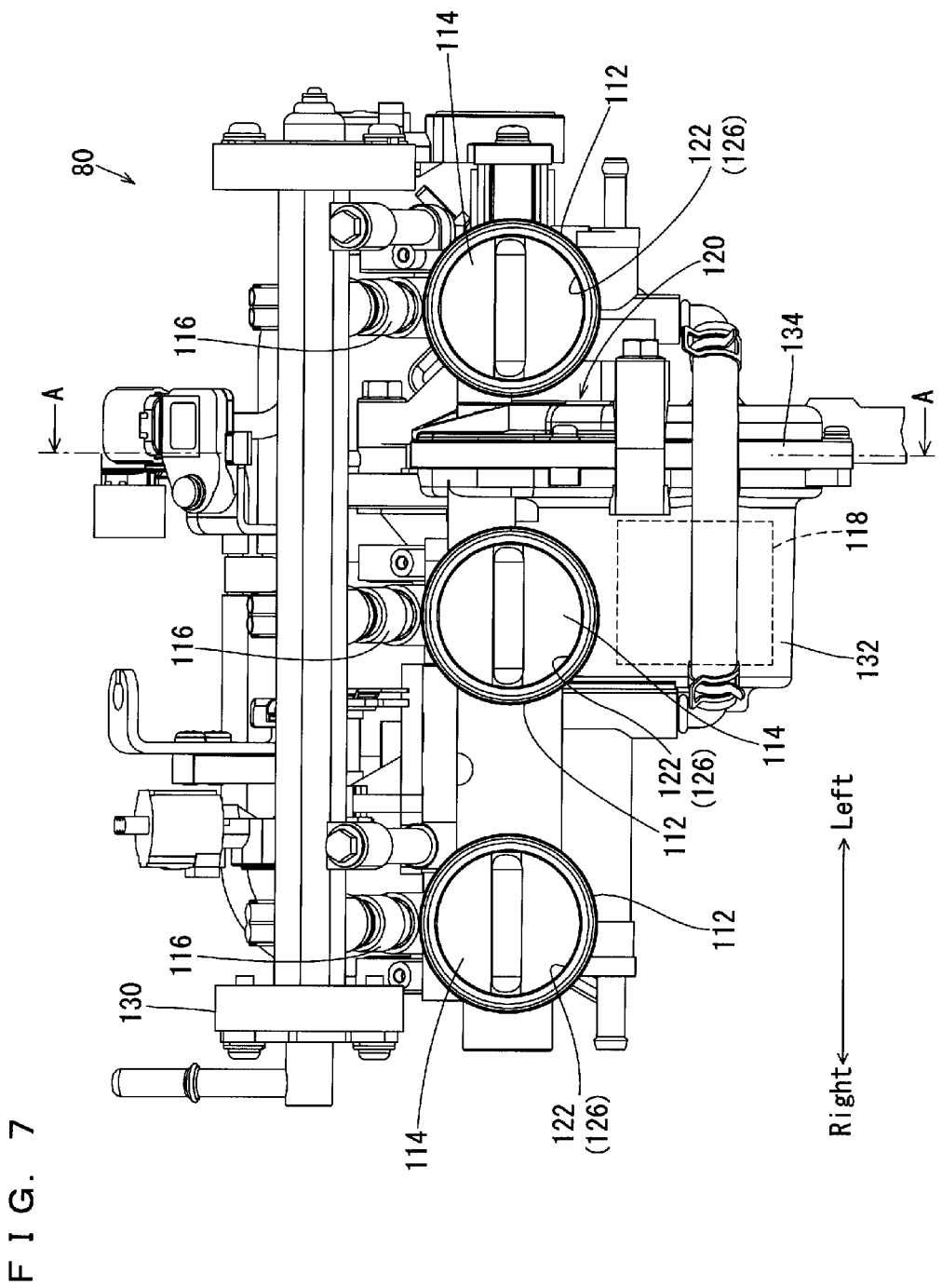

SNOWMOBILE

BACKGROUND OF THE INVENTION

1. Field of the Invention

The present invention relates to snowmobiles, and more specifically, to a snowmobile which includes a throttle motor disposed ahead of an engine.

2. Description of the Related Art

In snowmobiles, a snowmobile body has an engine room therein, and the engine room houses an engine and air-intake equipment. The engine room is subject to a risk that snow will come from ahead of the snowmobile body into a space in front of the engine.

JP-A H7-125679 discloses a snowmobile, in which an air intake opening is in a rear wall of the engine, and air-intake equipment and an air box are disposed behind the engine. Snowmobiles of such a type are not adversely affected by snow; i.e., if the snowmobile is equipped with an electronic throttle, the throttle motor will not be adversely affected by snow.

There is another type of snowmobiles, however, in which air-intake equipment and an air box are disposed ahead of the engine. If a snowmobile of this type is equipped with an electronic throttle, the throttle motor in the air-intake equipment can be adversely affected by snow if snow enters the engine room.

SUMMARY OF THE INVENTION

Therefore, preferred embodiments of the present invention provide a snowmobile in which the adverse affect of snow to the throttle motor is reduced and minimized.

According to a preferred embodiment of the present invention, a snowmobile includes a snowmobile body including an engine room therein; an engine disposed inside the engine room; a throttle valve arranged to adjust intake air supplied to the engine; a throttle motor disposed ahead of the engine and arranged to drive the throttle valve; and an intake box disposed ahead of the engine and including a portion located ahead of the throttle motor for the intake air to pass through toward the engine.

According to a preferred embodiment of the present invention, at least a portion of the intake box is ahead of the throttle motor, and the intake box works both in supplying intake air to the engine and blocking snow to the throttle motor. Therefore, even if snow comes from ahead of the snowmobile body, the intake box functions as a snow shield and prevents snow from reaching the throttle motor. This arrangement thus reduces and minimizes the adverse affects of snow reaching the throttle motor.

Preferably, the intake box is made of a resin, for example. In this case, it is easy to form the intake box into a desired shape. Therefore, the intake box can be easily formed into a specific shape selected for effective prevention of snow from entering. The arrangement thus provides a high level of design freedom.

Further preferably, the intake box is provided with a filtration member arranged to clean the intake air, and at least a portion of the intake box which includes a downstream side from the filtration member in terms of the intake air flow is located ahead of the throttle motor. The portion of the intake box which includes the downstream side from the filtration member in terms of the intake air flow receives radiation heat from the engine and in addition, this portion is not exposed to snow since the filtration member prevents snow from entering. Hence, this portion does not lose temperature easily. Therefore, the throttle motor and its surroundings do not lose temperature easily, which protects the throttle motor from snow.

Further, preferably, the snowmobile includes air-intake equipment which includes a throttle body arranged to house the throttle valve, and the throttle motor provided below the throttle body. With this arrangement, the throttle body includes therein an air passage for the intake air to flow to the engine, and the air-intake equipment is disposed ahead of the engine. In this case, the radiation heat from the engine prevents the air passage inside of the throttle body from losing temperature. Therefore, the throttle motor provided below the throttle body does not lose temperature easily. The arrangement thus protects the throttle motor from snow.

Preferably, the throttle motor is between a rear surface region of the intake box and a front surface region of the engine in a side view. In this case, the engine and the air box are behind and in front of the throttle motor respectively, i.e., the throttle motor is sandwiched from front and rear. Therefore, there is reduced chance for snow to reach the throttle motor.

Further preferably, the snowmobile further includes a heat source disposed in the front surface region of the engine. In this case, heat from the heat source protects the throttle motor from snow.

Further, preferably, the engine includes a plurality of cylinders disposed side by side in a direction of width of the snowmobile. In this case, even if the air-intake equipment and the intake box are disposed ahead of the engine, it is still possible to make the snowmobile body compact enough in the fore-aft direction. Also, it is possible to make the snowmobile body more compact in the fore-aft direction than in a case where the cylinders are disposed in the fore-aft direction.

Preferably, the throttle motor is within a dimension of the engine taken in the direction of width of the snowmobile. In this case, there is reduced chance for snow to reach the throttle motor from the snowmobile's width direction.

Further preferably, the throttle motor is housed in the engine room together with the engine and the intake box. In this case, radiation heat from the engine prevents the inside of the engine room from losing temperature and therefore, the throttle motor is protected from snow.

Further, preferably, the engine is disposed so that its cylinder axis is slanted rearward, and the throttle motor is ahead an upper portion of the engine. In this case, the throttle motor is subjected to radiation heat from the engine. This prevents the throttle motor from losing temperature, and thus the throttle motor is protected from snow.

Preferably, the air-intake equipment further includes a reduction gear mechanism arranged to transmit driving power from the throttle motor to the throttle valve, and the throttle motor is located farther inside than the reduction gear mechanism in the direction of width of the snowmobile. In this case, the throttle motor is protected from snow by the reduction gear mechanism which is positioned outside of the throttle motor.

Further preferably, the air-intake equipment includes a plurality of the air passages, and at least a portion of the reduction gear mechanism is between mutually adjacent two of the air passages. In this case, it is easy to provide the throttle motor, which is connected with the reduction gear mechanism, very close to the engine, allowing the throttle motor to effectively receive radiation heat from the engine. This protects the throttle motor from snow.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is an illustrative drawing of the air-intake equipment viewed from a direction duly oriented relative to an air inlet opening.

DETAILED DESCRIPTION OF THE PREFERRED EMBODIMENTS

Hereinafter, preferred embodiments of the present invention will be described with reference to the drawings.

Figure 1:
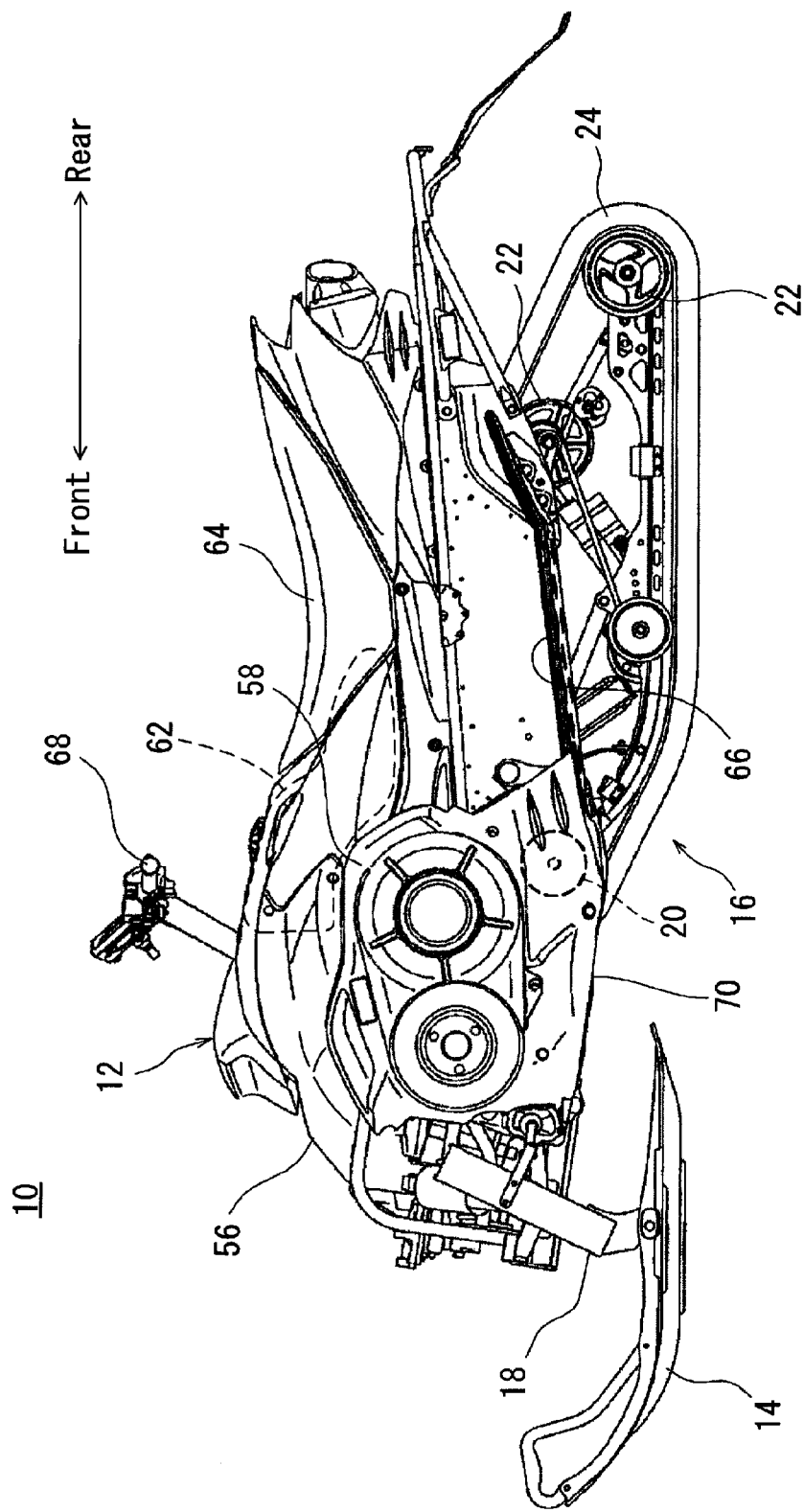
FIG. 1 is a left side view of a snowmobile according to a preferred embodiment of the present invention.
Figure 2:
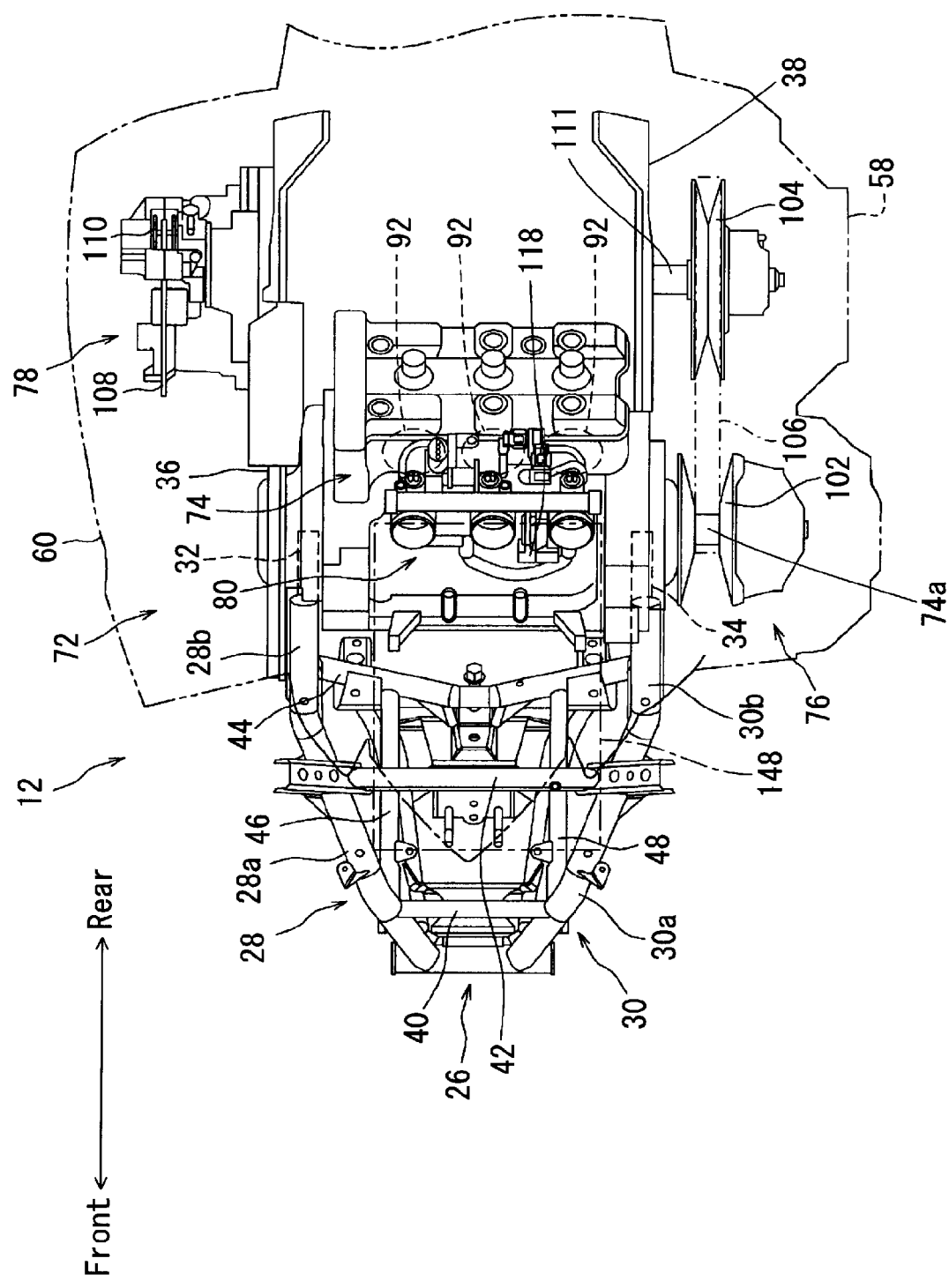
FIG. 2 is a plan view showing a configuration inside an engine room.
Figure 3:
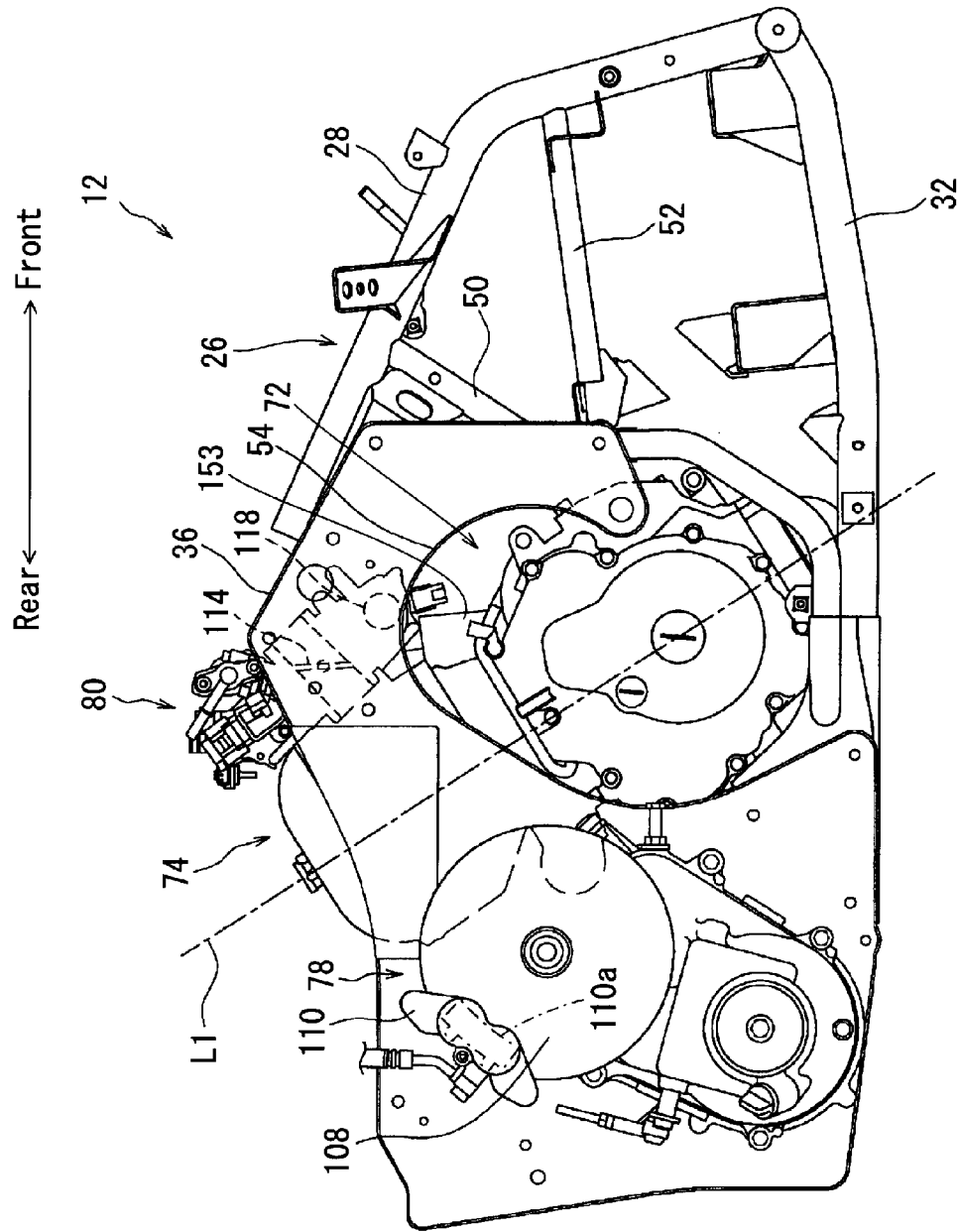
FIG. 3 is aright side view showing the configuration inside the engine room.

FIG. 1 is a side view of a snowmobile 10 according to a preferred embodiment of the present invention. FIG. 2 is a plan view showing a configuration inside of an engine room 72. FIG. 3 is aright side view showing the configuration inside of the engine room 72.

Referring to FIG. 1, the snowmobile 10 is a saddle-riding type vehicle including a snowmobile body 12, a left-and-right pair of skis 14, and a drive unit 16.

Each of the skis 14 in the pair is supported by a front portion of the snowmobile body 12 via a left and a right suspension mechanisms 18, respectively. Although FIG. 1 shows only the left ski 14 and the left suspension mechanism 18, there is another set of a ski 14 and a suspension mechanism 18 on the right side.

The drive unit 16 is provided below the snowmobile body 12. The drive unit 16 includes, driving wheels 20, driven wheels 22 and a track belt 24. The driving wheels 20 are rotated by driving power supplied from a CVT 76 to be described later. The track belt 24, is wound around the driving wheels 20 and the driven wheels 22 and rotated in a circulatory manner as the driving wheels 20 rotate. The driven wheels 22 are driven with the circulatory rotation of the track belt 24.

Now, the snowmobile body 12 will be described.

The snowmobile body 12 includes a frame 26.

Referring to FIG. 2 and FIG. 3, the frame 26 includes a left-and-right pair of front frame portions 28, 30; a left-and-right pair of bottom frame portions 32, 34; a right side-frame 36; and a left side-frame 38.

The front frame portions 28, 30 and the bottom frame portions 32, 34 preferably include pipe members. As shown in FIG. 2, the front frame portions 28, 30 are disposed at a distance from each other, in the vehicle's width direction. The front frame portions 28, 30 have a bent shape. More specifically, the front frame portions 28, 30 include front portions 28a, 30a respectively, which are slanted away from a fore-aft direction so that a distance between the two become smaller at a more forward position in a plan view. The front frame portions 28, 30 include rear portions 28b, 30b respectively, which extend substantially in the fore-aft direction in a plan view. Referring to FIG. 3, in a side view, the front frame portions 28, 30 extend from a front end of the bottom frame portions 32, 34 in an obliquely rearward and upward direction and then bend in a rearward direction in their middle portions.

The bottom frame portions 32, 34 have a bent shape similar to the front frame portions 28, 30 in a plan view. The bottom frame portions 32, 34 have their rear end portions extending beyond those of the front frame portions 28, 30.

The front frame portions 28, 30 and the bottom frame portions 32, 34 are provided with beam portions 40, 42, 44, 46, 48, 50 and 52. Referring to FIG. 2, the beam portions 40 and 42 connect the front portions 28a and 30a with each other. The beam portion 44 connects the rear portions 28b and 30b with each other. The beam portion 46 connects the front portion 28a and the beam portion 44 with each other whereas the beam portion 48 connects the front portion 30a and the beam portion 44 with each other. Referring to FIG. 3, the beam portion 50 connects the front frame portion 28 and the bottom frame portion 32 with each other whereas the beam portion 52 connects the front frame portion 28 and the beam portion 50 with each other. Although FIG. 3 shows only the rightside beam portions 50 and 52, the leftside beam portion 50 connects the front frame portion 30 and the bottom frame portion 34 with each other whereas the lefthand beam portion 52 connects the front frame portion 30 and the left beam portion 50 with each other.

The right side-frame 36 and the left side-frame 38 are platy members each containing a plane which includes the vertical and the fore-aft directions. As shown in FIG. 2, the right side-frame 36 and the left side-frame 38 are disposed at a distance from each other in the vehicle's width direction. The right side-frame 36 defines a partition between an engine 74 and brake equipment 78 to be described later in the vehicle's width direction. As shown in FIG. 3, an upward recessing cutout 54 is provided beneath a front portion of the right side-frame 36. The left side-frame 38 has a shape similar to the right side-frame 36. The left side-frame 38 provides a partition between the engine 74 and the CVT 76 in the vehicle's width direction.

Referring to FIG. 1 and FIG. 2, a front cover 56 is disposed at a front portion of the snowmobile body 12. On both sides of the front cover 56, side covers 58, 60 are disposed. A fuel tank 62 is disposed in an upper portion of the snowmobile body 12. Behind the fuel tank 62, a seat 64 is disposed for the rider to ride on. On the left and right sides below the seat 64, a left and a right footrests 66 are provided at a distance from each other. Although FIG. 1 shows only the left footrest 66, there is another footrest 66 on the right side. A handlebar 68 is provided above a front portion of the snowmobile body 12. A throttle operation member (not illustrated) is provided near a grip of the handlebar 68. In a lower portion of the snowmobile body 12, a bottom plate 70 is disposed. The bottom plate 70 includes a rear portion serving as a ceiling surface of a track house (not illustrated) which houses the track belt 24.

The snowmobile body 12 described thus far has an engine room 72 therein. The engine room 72 is defined by the front cover 56, the side covers 58, 60, the fuel tank 62 and the bottom plate 70. In a side view, the engine room 72 is between the handlebar 68, the suspension mechanisms 18 and the driving wheel 20.

Figure 4:
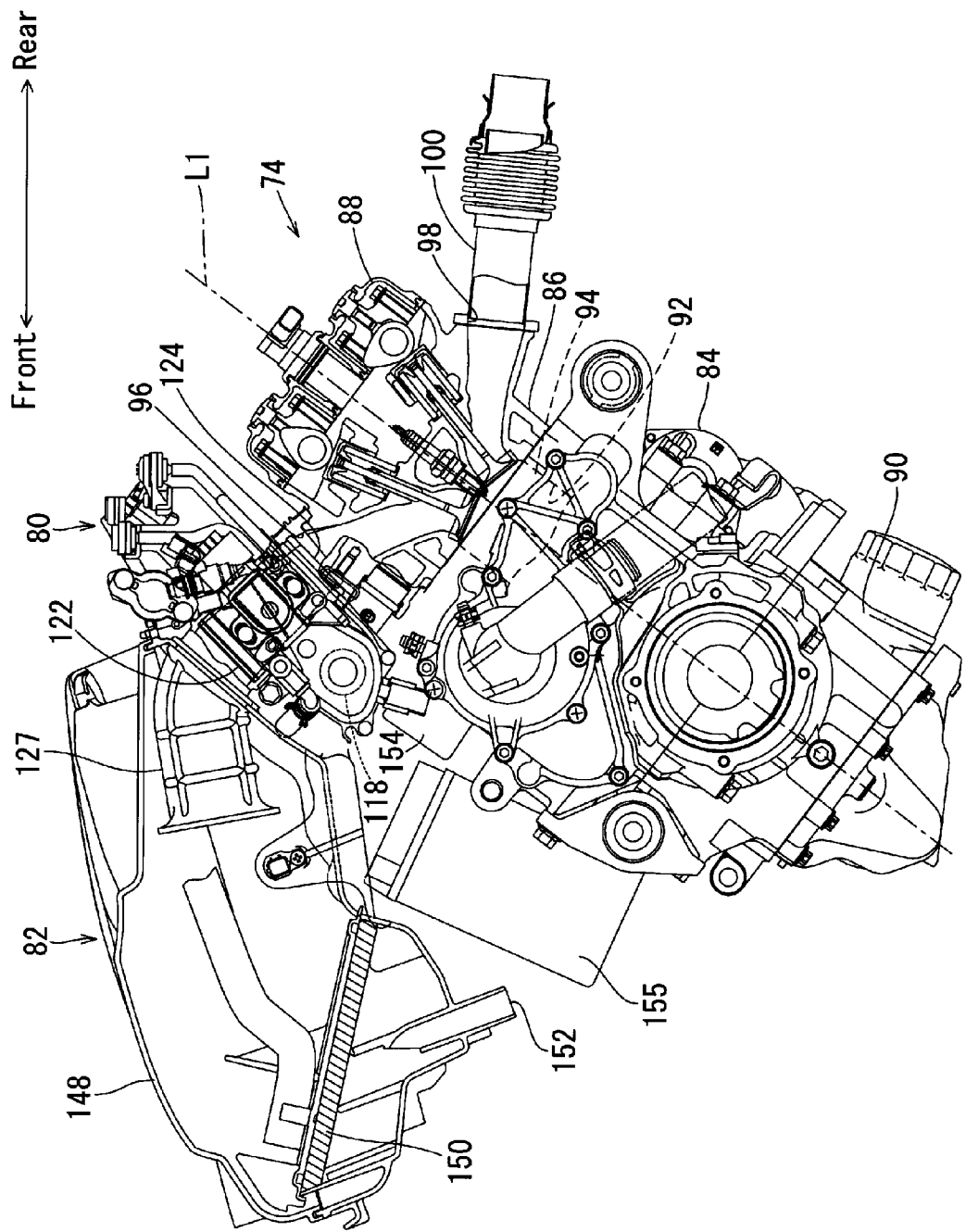
FIG. 4 is an illustrative left side view, showing an engine, air-intake equipment and an air cleaner.

Inside of the engine room 72, there are disposed the frame 26, the engine 74, the CVT 76, the brake equipment 78, the air-intake equipment 80 and an air cleaner 82 (see FIG. 4). It should be noted here that for the sake of clarity of the drawings, FIG. 2 and FIG. 3 do not show a portion of a configuration which includes the air cleaner 82.

FIG. 4 is a left side view showing the engine 74, the air-intake equipment 80 and the air cleaner 82.

The engine 74, which preferably is a liquid-cooled, four-cycle, three-cylinder engine for example, is housed inside the engine room 72. The engine 74 is located between the right side-frame 36 and the left side-frame 38.

Referring to FIG. 4, the engine 74 has a front-intake rear-exhaust structure, and includes a cylinder block 84, a cylinder head 86, a head cover 88 and a crankcase 90. The cylinder block 84 preferably includes three cylinders 92 disposed side by side in the vehicle's width direction (see FIG. 2). The cylinder head 86 is provided in an upper portion of the cylinder block 84. The head cover 88 is provided in an upper portion of the cylinder head 86. The crankcase 90 is provided at a lower portion of the cylinder block 84. The engine 74 has a slanted cylinder axis L1 so that an upper portion thereof is located at a more rearward position than a lower portion thereof.

Combustion chambers 94 are provided inside the cylinder block 84 and the cylinder head 86. The cylinder head 86 includes a front surface provided with air-intake openings 96, which communicate with the combustion chambers 94. The cylinder head 86 includes a rear surface provided with exhaust openings 98, which communicate with the combustion chambers 94. The exhaust openings 98 are connected with exhaust pipes 100. The exhaust pipes 100 lead to an outlet end at a rear portion of the snowmobile body 12.

The CVT 76 in FIG. 2, which is disposed inside the engine room 72 together with the engine 74, includes a drive pulley 102 and a driven pulley 104. The drive pulley 102 is disposed on the left side of the engine 74, and is connected with a crankshaft 74a of the engine 74. The driven pulley 104 is disposed at a rearward position from the drive pulley 102. The drive pulley 102 and the driven pulley 104 are connected with each other by a belt 106. The drive pulley 102 and the driven pulley 104 are disposed on the outer side of the left side-frame 38.

The brake equipment 78 is disposed inside the engine room 72 together with the engine 74. As shown in FIG. 3, the brake equipment 78 is disposed at a more rearward position than the cylinder axis L1 of the engine 74 in a side view. The brake equipment 78 includes a brake disc 108 and a brake caliper 110. The brake caliper 110 includes brake pads 110a. The brake disc 108 is mounted on the shaft 111, which is connected with the driven pulley 104. When the brake is applied, the brake caliper 110 firmly presses the brake disc 108 from both sides. The brake disc 108 and the brake caliper 110 are disposed on an outer side of the right side-frame 36. It should be noted here that for the sake of clarity of the drawing, FIG. 2 shows only a portion of the shaft 111.

Referring to FIG. 4, the air-intake equipment 80, which supplies air to the combustion chambers 94 via the air-intake openings 96 of the engine 74, is disposed in front of the engine 74.

Figure 5:
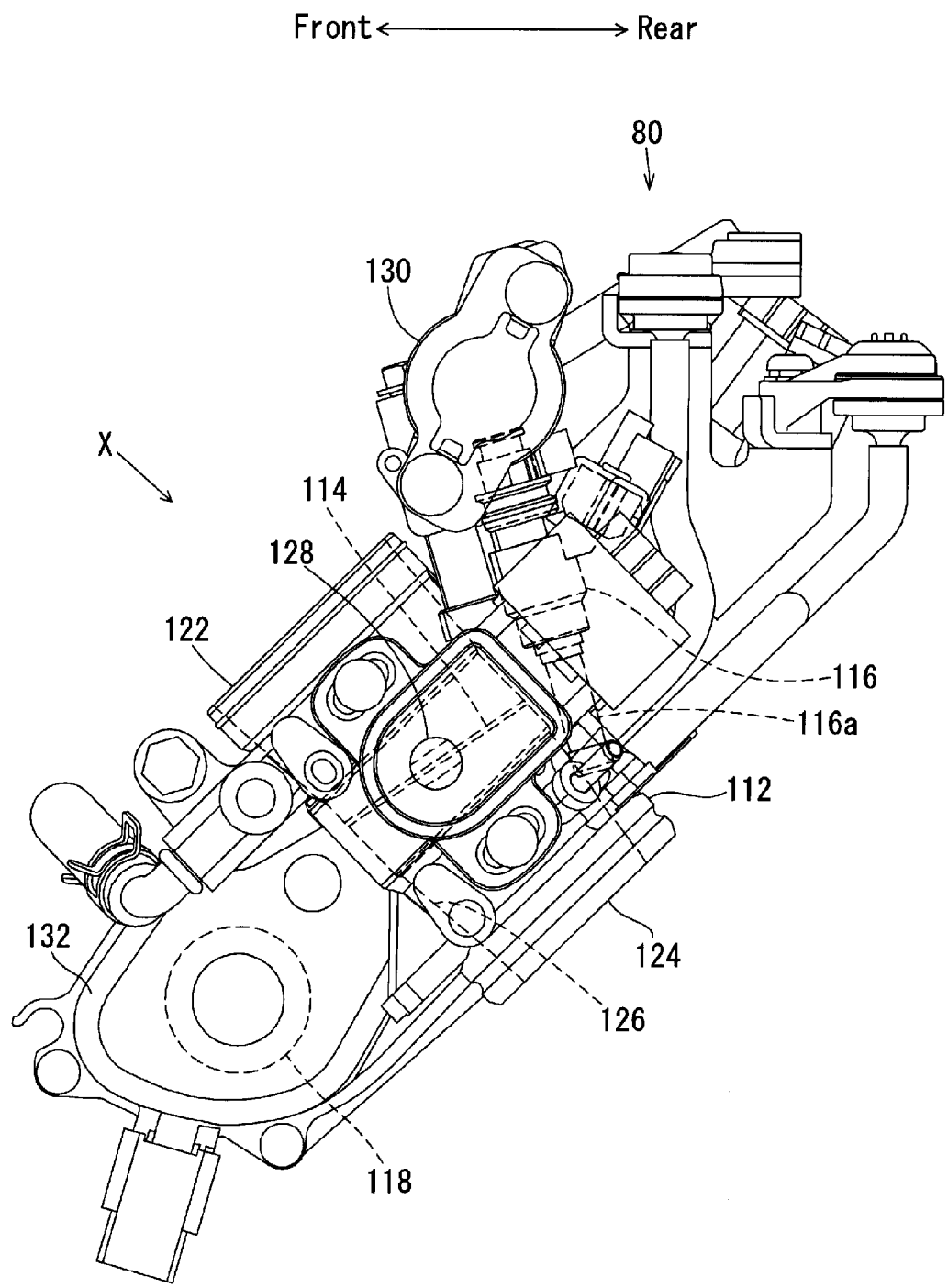
FIG. 5 is an illustrative left side view of the air-intake equipment in FIG. 7.
Figure 6:
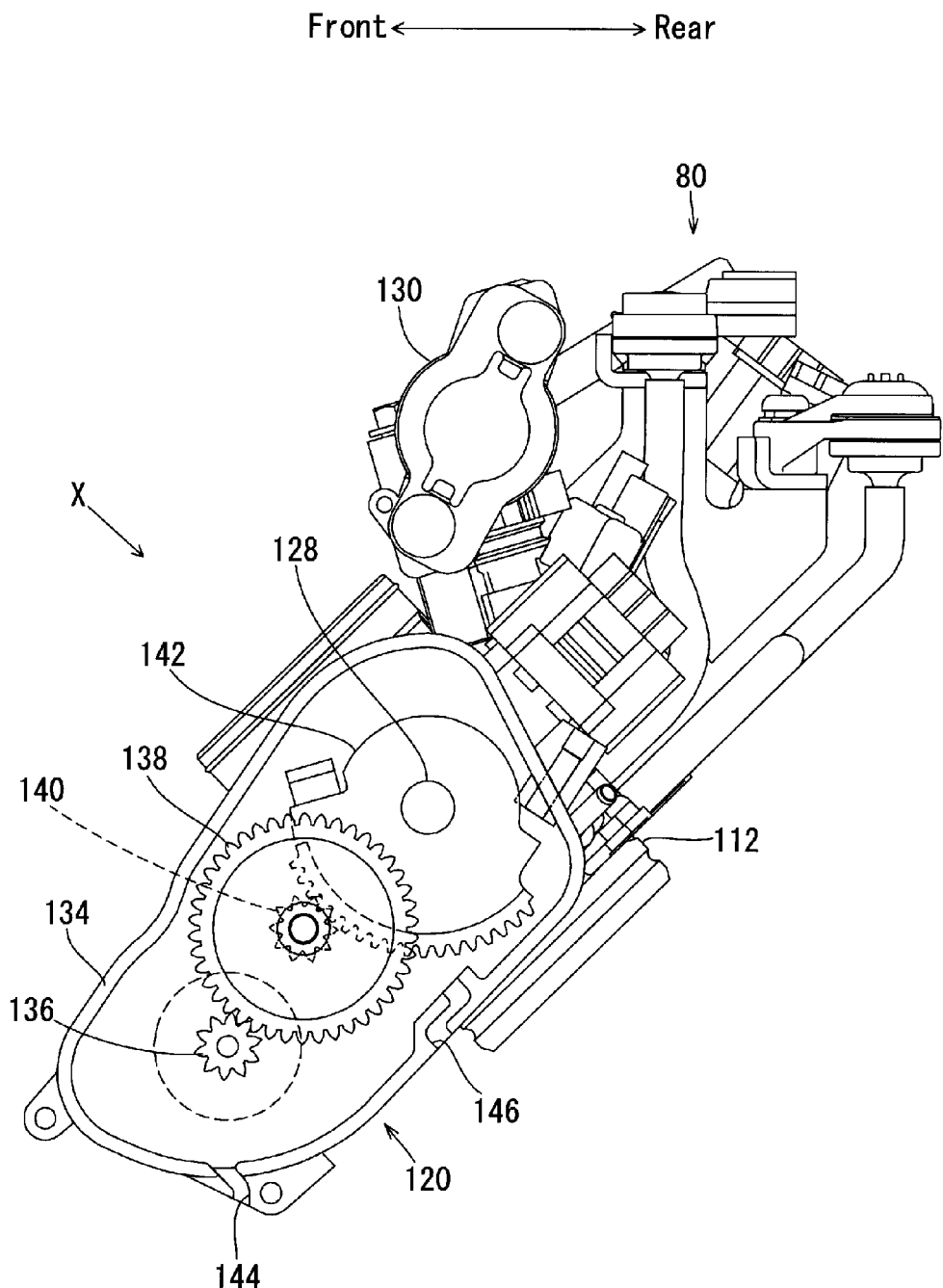
FIG. 6 is an illustrative sectional view taken along lines A-A in FIG. 7.

FIG. 5 is an illustrative left side view of the air-intake equipment in FIG. 7. FIG. 6 is an illustrative sectional view taken in lines A-A in FIG. 7. FIG. 7 is an illustrative drawing of the air-intake equipment 80 viewed from a direction (Direction X in FIG. 5 and FIG. 6) duly oriented relative to its air inlet opening 122 (to be described later).

Referring to FIG. 5 through FIG. 7, the air-intake equipment 80 includes a plurality of throttle bodies 112, a plurality of throttle valves 114, a plurality of fuel injection valves 116, a throttle motor 118 and a reduction gear mechanism 120. The present preferred embodiment preferably includes three throttle bodies 112, three throttle valves 114 and three fuel injection valves 116.

Each throttle body 112 preferably includes a tubular member having openings at both ends. Each throttle body 112 includes an air inlet opening 122 at an end; an air outlet opening 124 at the other end; and an air passage 126 therein. The air inlet opening 122 serves as an end of the air passage 126. As shown in FIG. 4, each air inlet opening 122 is connected with an end of an air intake duct 127. The air intake duct 127 has another end, which is inserted into the common air cleaner 82. The air outlet opening 124 serves as the other end of the air passage 126. The air outlet opening 124 is connected with the air-intake opening 96 of the engine 74. Air from the air-intake opening 96 passes through the air passage 126 and is supplied to the engine 74. Also, the throttle body 112 includes an unillustrated hot-water flow path so that hot water can be circulated inside the throttle body 112 to prevent freezing.

The throttle valve 114 is provided in the air passage 126 inside the throttle body 112. The throttle valve 114, which is variably adjustable between its fully opened position and fully closed position, adjusts the amount of air supplied to the engine 74. Each throttle valve 114 is connected with each other by a common valve shaft 128. The valve shaft 128 includes a spring (not illustrated) which urges the throttle valves 114 toward the fully closed position.

The fuel injection valve 116 is provided above the throttle body 112. The fuel injection valve 116 includes a nozzle 116a arranged to inject fuel. The nozzle 116a has its tip portion inserted into the air passage 126 in the throttle body 112. Each fuel injection valve 116 is connected with a common fuel supply pipe 130. The fuel supply pipe 130 is connected with a fuel pump (not illustrated). The fuel pump supplies the fuel to each of the fuel injection valves 116 via the fuel supply pipe 130.

The throttle motor 118 is housed in the motor casing 132, and opens and closes the throttle valve 114. The throttle motor 118 is provided below the throttle body 112. Specifically, the throttle motor 118 is disposed on a side away from the fuel injection valves 116 as viewed from the throttle body 112. Also, referring to FIG. 3 and FIG. 4, the throttle motor 118 is disposed within the width of the engine 74 which is an engine dimension in the vehicle's width direction, and is ahead of an upper portion of the engine 74, to face the front surface of the engine 74. Therefore, the throttle motor 118 is located at a more forward position than the brake equipment 78, with the engine 74 disposed in between. In a side view, the throttle motor 118 is located at a more forward position than the cylinder axis L1 of the engine 74. Also, the throttle motor 118 is disposed at a higher position than the brake pads 110a of the brake equipment 78, so as to overlap the right side-frame 36 in a side view. The throttle motor 118 and the brake equipment 78 do not overlap each other when viewed from front. Further, at least a portion of the throttle motor 118 is located at a higher position than the brake equipment 78. It should be noted here that the snowmobile 10 includes an unillustrated controller, which controls the throttle motor 118 based on operations made to the earlier-mentioned throttle operation member. Specifically, so called electronic throttle control is performed.

Referring to FIG. 6, the reduction gear mechanism 120 includes a gear case 134, and gears 136, 138, 140 and 142. The gear case 134 is provided next to a motor casing 132 in the vehicle's width direction. The gears 136 through 142 are preferably made of resin, for example, housed in the gear case 134, and transmit driving power from the throttle motor 118 to the valve shaft 128 and the throttle valve 114. The gear case 134 includes a first hole 144 which is open to the atmosphere in its bottom portion, and a second hole 146 which is open to the atmosphere and is arranged at a higher position than the first hole 144. The first hole 144 extends in a generally V shape. The second hole 146 extends in a generally Z shape.

Returning to FIG. 4, the air cleaner 82 includes an air box 148 and an air filter 150. The air box 148 is an intake box, is preferably made of resin, for example, and is disposed ahead of the engine 74, and more particularly ahead of the cylinder head 86. The air box 148 is disposed so as to cover a space in front of the throttle motor 118. In other words, a portion of the air box 148 is ahead of the throttle motor 118. In particular, at least a portion of the air box 148 including a downstream side from the air filter 150 in terms of the intake air flow is located ahead of the throttle motor 118. Therefore, the throttle motor 118 is between a rear surface region of the air box 148 and a front surface region of the engine 74 in a side view.

Also, the air intake duct 127, which is connected with the throttle bodies 112, is inserted into a rear portion of the air box 148. The air box 148 includes a front bottom portion including an air-intake inlet 152. The air filter 150 is a filtration member, is provided inside the air box 148, and cleans air which passes through the air box 148. The air filter 150 is preferably provided by a coarsely textured sponge, for example, so as to prevent snow from entering. More specifically, the sponge serves as a snow shield, too. The air comes in from the air-intake inlet 152 of the air box 148, into the air box 148, passes through the air filter 150 and the air intake duct 127, and then enters the air-intake equipment 80.

A breather chamber 153 (see FIG. 3) and an oil cooler 154 (see FIG. 4) are provided on the front surface region of the engine 74. A battery 155 is provided on the front surface region of the engine 74. The battery 155 is below the air cleaner 82. The battery 155 is in proximity to the throttle motor 118, and is opposed to the throttle motor 118.

According to the snowmobile 10 as described thus far, a portion of the air box 148 is ahead of the throttle motor 118, and the air box 148 works both in supplying intake air to the engine 74 and blocking snow to the throttle motor 118. Therefore, when snow comes from ahead of the snowmobile body 12 and enters the engine room 72, the air box 148 serves as a snow shield, and prevents the snow from reaching the throttle motor 118. The arrangement thus reduces and minimizes the adverse affects of snow reaching the throttle motor 118.

The air box 148, which is preferably made of resin, can be easily formed into a desired shape. Therefore, the air box 148 can be easily formed into a specific shape selected for efficient prevention of snow from entering. The arrangement thus provides a high level of design freedom.

At least a portion of the air box 148 including the downstream side from the air filter 150 in terms of the intake air flow, i.e., a portion close to the engine 74, is located ahead of the throttle motor 118. This portion of the air box 148 which includes a downstream side from the air filter 150 in terms of the intake air flow receives radiation heat from the engine 74 and in addition, this portion is not exposed to snow since the air filter 150 prevents snow from entering. Hence, this portion does not lose temperature easily. Therefore, the throttle motor 118 and its surroundings do not lose temperature easily, which protects the throttle motor 118 from snow.

The throttle motor 118 is provided below the throttle body 112 in the air-intake equipment 80. The radiation heat from the engine 74 prevents the air passage 126 inside of the throttle body 112 from losing temperature. Therefore, the throttle motor 118 provided below the throttle body 112 does not lose temperature easily. The arrangement thus protects the throttle motor 118 from snow.

The throttle motor 118 is between a rear surface region of the air box 148 and a front surface region of the engine 74 in a side view. Specifically, the engine 74 and the air box 148 are behind and in front of the throttle motor 118 respectively, i.e., the throttle motor 118 is sandwiched from front and rear. Therefore, there is reduced chance for snow to reach the throttle motor 118.

The breather chamber 153, the oil cooler 154 and the battery 155 disposed on the front surface region of the engine 74 are heat sources. Therefore, heat from these heat sources protects the throttle motor 118 from snow.

The engine 74 has a plurality of cylinders 92 disposed side by side in the snowmobile's width direction. Therefore, even if the air-intake equipment 80 and the air cleaner 82 are disposed ahead of the engine 74, it is still possible to make the snowmobile body 12 compact enough in the fore-aft direction. Also, it is possible to make the snowmobile body 12 more compact in the fore-aft direction than in a case where the cylinders 92 are disposed in the fore-aft direction.

The throttle motor 118 is disposed within a dimension of the engine 74 taken in the vehicle's width direction. Therefore, there is reduced chance for snow to reach the throttle motor 118 from the snowmobile's width direction.

The throttle motor 118 is housed in the engine room 72 together with the engine 74 and the air box 148, and radiation heat from the engine 74 prevents the inside of the engine room 72 from losing temperature. Thus, the throttle motor 118 is protected from snow.

The engine 74 is disposed so that its cylinder axis L1 is slanted rearward, and the throttle motor 118 is disposed ahead of the upper portion of the engine 74. In this case, the throttle motor 118 is subjected to thermal radiation from the engine 74. This prevents the throttle motor 118 from losing temperature, and thus the throttle motor 118 is protected from snow.

The throttle motor 118 is disposed on a laterally more inward side of the snowmobile than the reduction gear mechanism 120. Therefore, the throttle motor 118 is protected from snow by the reduction gear mechanism 120 which is positioned on an outward side of the throttle motor 118.

At least a portion of the reduction gear mechanism 120 is between two mutually adjacent air passages 126. In this case, it is easy to provide the throttle motor 118, which is connected with the reduction gear mechanism 120, closely to the combustion chambers 94 of the engine 74. This allows the throttle motor 118 to effectively receive radiation heat from the engine 74. This protects the throttle motor 118 from snow.

It should be noted here that the present preferred embodiment of the present invention requires that the air cleaner 82 at least includes a portion which is located ahead of the throttle motor 118. Specifically, the air cleaner 82 may have a portion which is not located ahead of the throttle motor 118.

The component disposed ahead of the engine 74 need not necessarily be the air cleaner 82, but may be another intake box. Any intake-air passage member which has a portion located ahead of the throttle motor 118 can protect the throttle motor 118 from snow.

The preferred embodiments of the present invention are not limited to cases where all of the breather chamber 153, the oil cooler 154 and the battery 155 are provided in the front surface region of the engine 74. The arrangement is complete as long as at least one of these components is provided in the front surface region of the engine 74. Also, heat sources other than the breather chamber 153, the oil cooler 155 and the battery 155 may be disposed in the front surface region of the engine 74.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A snowmobile comprising:
    a snowmobile body including an engine room;
    an engine disposed inside the engine room;
    a throttle valve arranged to adjust intake air supplied to the engine;
    a throttle motor arranged to drive the throttle valve; and
    an intake box arranged to pass the intake air therethrough and toward the engine; wherein
    the throttle motor is located above a lowermost portion of the intake box and between the intake box and the engine in a side view of the snowmobile; and
    the throttle motor is disposed outside of the intake box.

2. The snowmobile according to claim 1, wherein the intake box is made of a resin.

3. The snowmobile according to claim 1, wherein the intake box includes a filtration member arranged to clean the intake air.

4. The snowmobile according to claim 1, further comprising air-intake equipment including a throttle body arranged to house the throttle valve, wherein the throttle motor is provided below the throttle body, and the throttle body includes an air passage for the intake air to flow to the engine.

5. The snowmobile according to claim 1, wherein the engine includes a plurality of cylinders disposed side-by-side in a width direction of the snowmobile.

6. The snowmobile according to claim 1, wherein the throttle motor is within a dimension of the engine taken in a width direction of the snowmobile.

7. The snowmobile according to claim 1, wherein the throttle motor is housed in the engine room together with the engine and the intake box.

8. The snowmobile according to claim 1, further comprising air-intake equipment including a throttle body arranged to house the throttle valve, and a reduction gear mechanism arranged to transmit driving power from the throttle motor to the throttle valve; wherein
    the throttle motor is located farther inside than the reduction gear mechanism in a width direction of the snowmobile.

9. The snowmobile according to claim 1, further comprising air-intake equipment including a throttle body arranged to house the throttle valve, and a reduction gear mechanism arranged to transmit driving power from the throttle motor to the throttle valve; wherein
    the reduction gear mechanism includes a gear case and gears, and the gear case is provided next to a motor casing in a width direction of the snowmobile.

10. The snowmobile according to claim 1, further comprising a front cover disposed at a front portion of the snowmobile body, wherein the front cover is disposed above the throttle motor.

11. The snowmobile according to claim 1, wherein the throttle valve includes a valve shaft extending in a horizontal direction.

12. A snowmobile comprising:
    a snowmobile body including an engine room;
    an engine disposed inside the engine room;
    a throttle valve arranged to adjust intake air supplied to the engine;
    a throttle motor arranged to drive the throttle valve; and
    an air box arranged to pass the intake air therethrough and toward the engine and disposed forward of the engine; wherein
    the throttle motor is located rearward of the air box in a side view of the snowmobile.

13. The snowmobile according to claim 12, wherein the air box is made of a resin.

14. The snowmobile according to claim 12, further comprising a filtration member arranged to clean the intake air, wherein at least a portion of the air box including a downstream side of the filtration member is located forward of the throttle motor.

15. The snowmobile according to claim 12, further comprising air-intake equipment including a throttle body arranged to house the throttle valve, wherein the throttle motor is provided below the throttle body, and the throttle body includes an air passage for the intake air to flow to the engine.

16. The snowmobile according to claim 12, wherein the engine includes a plurality of cylinders disposed side-by-side in a width direction of the snowmobile.

17. The snowmobile according to claim 12, wherein the engine is a three-cylinder engine.

18. The snowmobile according to claim 12, wherein the throttle motor is within a dimension of the engine taken in a width direction of the snowmobile.

19. The snowmobile according to claim 13, further comprising air-intake equipment including a throttle body arranged to house the throttle valve, and a reduction gear mechanism arranged to transmit driving power from the throttle motor to the throttle valve; wherein
    the throttle motor is located farther inside than the reduction gear mechanism in a width direction of the snowmobile.

20. The snowmobile according to claim 12, further comprising air-intake equipment including a throttle body arranged to house the throttle valve, and a reduction gear mechanism arranged to transmit driving power from the throttle motor to the throttle valve; wherein
    the reduction gear mechanism includes a gear case and gears, and the gear case is provided next to a motor casing in a width direction of the snowmobile.

21. The snowmobile according to claim 12, further comprising a front cover disposed at a front portion of the snowmobile body and located forward of the throttle motor.

22. The snowmobile according to claim 12, wherein the throttle valve includes a valve shaft extending in a horizontal direction.

23. The snowmobile according to claim 12, further comprising a battery disposed below the throttle motor.

24. The snowmobile according to claim 12, further comprising a continuously variable transmission disposed on a left side of the engine, wherein the throttle motor is disposed near or adjacent to the left side of the engine.

25. A snowmobile comprising:
a snowmobile body including an engine room;
an engine disposed inside the engine room;
a throttle valve arranged to adjust intake air supplied to the engine;
a throttle motor arranged to drive the throttle valve; and
an intake-air passage member including an air box arranged to pass the intake air therethrough and toward the engine; wherein
the throttle motor is located rearward of the air box in a side view of the snowmobile and located above a lowermost portion of the intake-air passage member.

26. The snowmobile according to claim 25, wherein the air box is made of a resin.

27. The snowmobile according to claim 25, further comprising a filtration member arranged to clean the intake air, wherein at least a portion of the air box including a downstream side of the filtration member is located forward of the throttle motor.

28. The snowmobile according to claim 25, further comprising air-intake equipment including a throttle body arranged to house the throttle valve, wherein the throttle motor is provided below the throttle body, and the throttle body includes an air passage for the intake air to flow to the engine.

29. The snowmobile according to claim 25, wherein the engine includes a plurality of cylinders disposed side-by-side in a width direction of the snowmobile.

30. The snowmobile according to claim 25, wherein the throttle motor is within a dimension of the engine taken in a width direction of the snowmobile.

31. The snowmobile according to claim 25, further comprising air-intake equipment including a throttle body arranged to house the throttle valve, and a reduction gear mechanism arranged to transmit driving power from the throttle motor to the throttle valve; wherein
the throttle motor is located farther inside than the reduction gear mechanism in a width direction of the snowmobile.

32. The snowmobile according to claim 25, further comprising air-intake equipment including a throttle body arranged to house the throttle valve, and a reduction gear mechanism arranged to transmit driving power from the throttle motor to the throttle valve; wherein
the reduction gear mechanism includes a gear case and gears, and the gear case is provided next to a motor casing in a width direction of the snowmobile.

33. The snowmobile according to claim 25, further comprising a front cover disposed at a front portion of the snowmobile body and located forward of the throttle motor.

34. The snowmobile according to claim 25, wherein the throttle valve includes a valve shaft extending in a horizontal direction.

35. The snowmobile according to claim 25, further comprising a battery disposed below the throttle motor.

36. The snowmobile according to claim 25, further comprising a continuously variable transmission disposed on a left side of the engine, wherein the throttle motor is disposed near or adjacent to the left side of the engine.

* * * * *